Nov. 1, 1932.  G. W. BUNGAY  1,886,250
JUICE EXTRACTOR
Filed Dec. 2, 1931  3 Sheets-Sheet 1
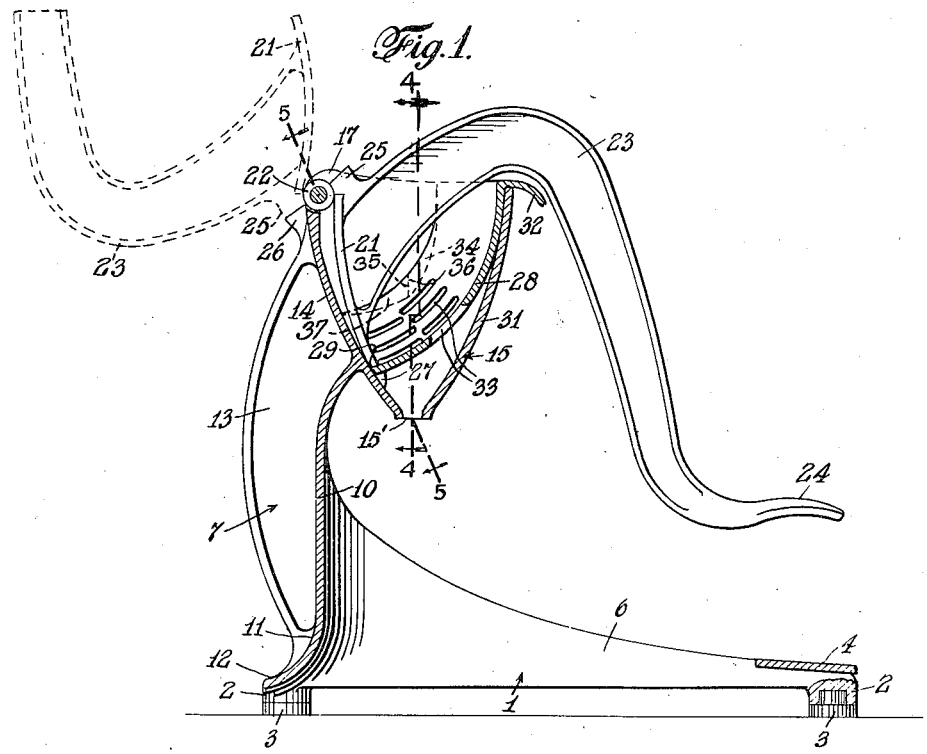

Nov. 1, 1932.    G. W. BUNGAY    1,886,250
JUICE EXTRACTOR
Filed Dec. 2, 1931    3 Sheets-Sheet 2
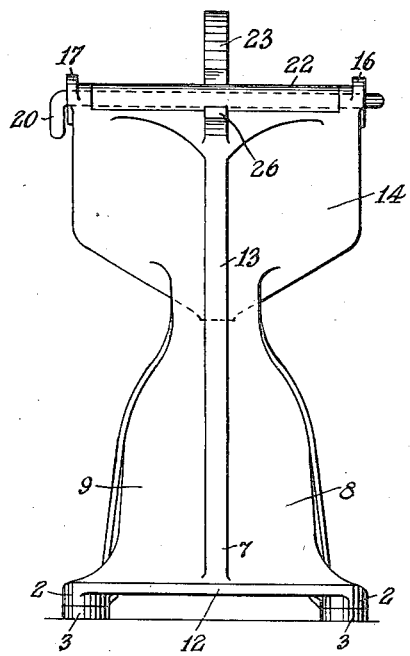
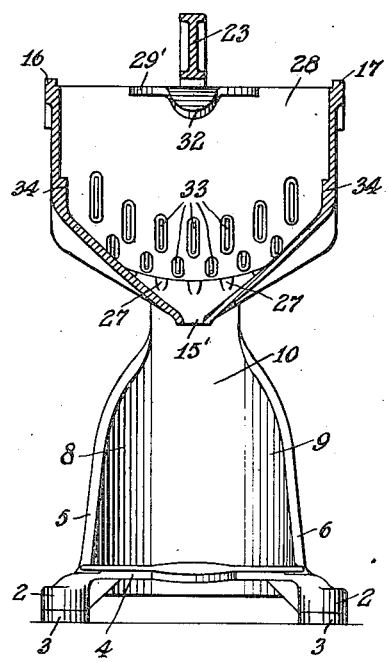
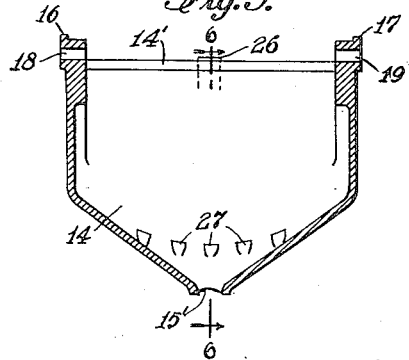
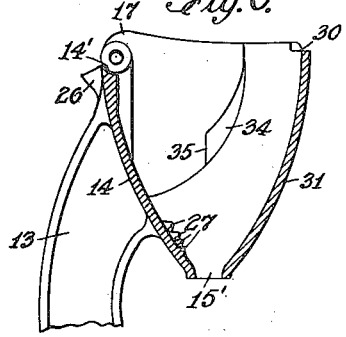
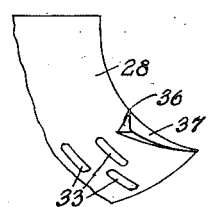

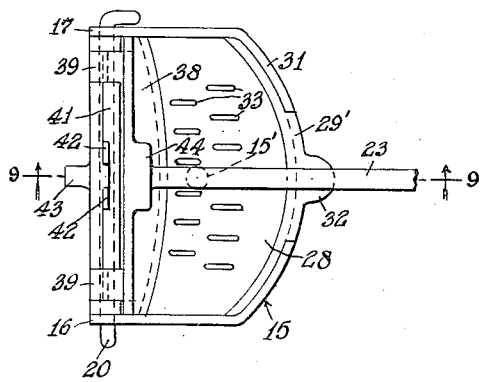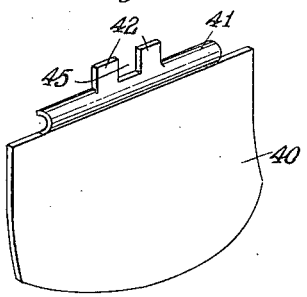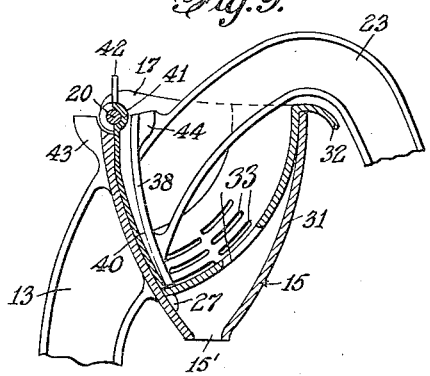

Patented Nov. 1, 1932

1,886,250

UNITED STATES PATENT OFFICE

GEORGE W. BUNGAY, OF PLAINFIELD, NEW JERSEY, ASSIGNOR, BY MESNE ASSIGNMENTS, TO BUNGAY-WOLF CORPORATION, OF NEW YORK, N. Y., A CORPORATION OF NEW YORK

JUICE EXTRACTOR

Application filed December 2, 1931. Serial No. 578,436.

This invention relates to a juice extractor and more particularly to a fruit juice extractor.

One object of this invention is to have one side of the bowl of the juice extractor act as an abutment to directly oppose the pressing force of the presser plate and to provide a simple, rigid construction, and further to permit the use of a simple form of strainer plate which can be readily removed, cleaned and reinserted in position in the bowl.

Another object of this invention is to provide the bowl with a straight top edge with the pivot for the presser plate located along the straight edge for maximum leverage and to prevent juice from squirting out along the pivoted edge of the presser plate, and further to have the bowl and strainer plate closely conform to the presser plate throughout the latter's path of travel to prevent juice from squirting out.

Another object of this invention is to provide a construction whereby water can be readily flushed straight down through the bowl and through an open base.

A further object of the invention is to provide a strong base construction with maximum room under the bowl to accommodate a juice container and to enable easy insertion and removal of such container.

A still further object of the invention is to provide an operating or hand lever which will give maximum operating leverage in its various fruit pressing positions together with maximum stability of the juice extractor during all such operating positions.

The above and other objects and advantages will appear from the following description, appended claims and accompanying drawings forming a part of this specification and in which:

Figure 1 is a vertical, longitudinal, sectional view of the invention on line 1—1 of Figure 2.

Figure 2 is a top plan view of the invention illustrated in Figure 1.

Figure 3 is a rear elevation from the left of Figure 1.

Figure 4 is a sectional elevation on line 4—4 of Figure 1 together with the strainer plate in elevation.

Figure 5 is a sectional view of the bowl on line 5—5 of Figure 1.

Figure 6 is a sectional view of the bowl on line 6—6 of Figure 5.

Figure 7 is a perspective view of a portion of the strainer plate showing one of the locking lugs.

Figure 8 is a plan view of a portion of a modified form of the invention having an ejector plate.

Figure 9 is a sectional elevation on line 9—9 of Figure 8.

Figure 10 is a perspective view of the ejector plate.

In a preferred embodiment of the invention which is illustrated in the drawings, the base 1 is provided with four spaced supporting feet 2 which may be provided with soft pads 3 of rubber, felt, or the like. The bar 4 connects the feet 2 together at the front of the machine. Extending from the bar 4 and the feet which the bar connects are two spaced upstanding side members 5 and 6 which become wider as they extend toward the upright support 7 to which they are connected by curving toward each other, as indicated by the dotted lines 8 and 9 in Figure 2, whence they merge with the upright, transversely extending flange 10 of the upright support 7 and extend downward to form the curved portion 11 which joins with the transversely extending bar portion 12 which connects two of the supporting feet 2 together. The flanges 10 and 13 of the support 7 are transverse to each other and extend upwardly and merge into the side 14 of the bowl 15.

At its lower end the bowl 15 is provided with an opening 15′ for the passage of juice downward therethrough. It will be observed that the opening 15′ is spaced well above the supporting feet 2 and directs the juice downward in a line that is well spaced from the side members 5 and 6 and the flange 10, and since the entire bottom of the base 1 to the right of the flange 10 is open except for the small cross-piece 4, there is ample room for easy insertion and removal of the container to catch the juice from the opening 15′.

In a preferred embodiment, the bowl 15 is provided with ears 16 and 17 at the upper end of the side 14, which ears have openings 18 and 19 through which extends a pintle or pivot rod 20. The presser plate 21 has a tubular portion 22 between the ears 16 and 17 and is supported on the pivot rod 20. It will be noted that the side 14 of the bowl 15 is straight in a longitudinal horizontal direction and that the outside of the pivoted tubular portion 22 of the presser plate has that portion of its outside surface cylindrical, which rotates past the straight upper edge 14' (Figure 5) of the side 14 so as to provide a close joint to prevent juice from squirting through the joint. Also, by having the side 14 substantially straight along its upper edge and the pivot axis parallel to and along the inside of the side 14, maximum leverage is provided. Extending from the presser plate 21 is the operating or hand lever 23 having the hand-engaging portion 24.

When the hand-engaging portion 24 is in its lowermost position, as shown in full lines in Figure 1, it is well below a horizontal plane passing through the pivot 20, and, therefore, when the presser plate 21 is swung from its lowermost position up to approximately horizontal position where it will be when it initially engages the fruit, the hand grip 24 will also swing upward about the pintle 20 as a center and will arrive at a position which is substantially directly above its lowermost position, thus assuring ample fruit-pressing leverage in a downward direction, and at such a distance to the right of the pivot 20 in Figure 1 as to assure maximum stability in all the fruit-pressing positions. The presser plate 21 and lever 23 are shown dotted in Figure 1 in their full open position and with the limit lug 25 of the presser plate in engagement with the limit lug 26 on the side 14 of the bowl, and with the presser plate 21 substantially vertical. In this full open position, water can be readily flushed down into the bowl, out through the opening 15' and down through the space between the side portions 5 and 6 of the base.

Along the lower portion of the side 14 of the bowl are supporting lugs 27 on which the lower end of the strainer plate 28 rests. Referring to Figure 1 of the drawings, it is apparent that adjacent the strainer plate and within the bowl there is provided a space constituting a juice-receiving chamber and adapted to temporarily hold a quantity of juice until it can flow out of the opening 15'. In other words, the strainer plate functions to divide the interior of the bowl into two compartments, i. e. the juice-extracting chamber and the juice-receiving chamber. The ends of the bowl are made to conform closely to the path of movement of the sides of the presser plate, whether said sides are made straight as shown or otherwise, so as to prevent squirting of juice. The front edge 29 of the presser plate may be curved as shown in the drawings. The strainer plate is arcuate in vertical section to closely conform to the path of movement of the front curved edge 29 of the presser plate and curved in horizontal section to conform to the curved front edge 29 of the presser plate to thereby prevent squirting of juice, and at its upper end is formed with the projecting portion 29' to seat in the cut-out portion 30 in the top edge of the side 31 of the bowl 15. Part of the projecting portion 29' is extended to form the finger-engaging portion 32 to permit ready removal of the strainer plate from the bowl. The strainer plate has strainer openings 33 of any suitable known form and arrangement. The bowl 15 may have lugs 34 having upstanding engaging faces 35 adapted to engage similar upstanding engaging faces 36 on the lugs 37, the latter being provided on the strainer plate 28. It will thus be seen that when the strainer plate 28 is lowered into the bowl 15, the faces 36 will slide down past the faces 35 and engage therewith, thus preventing the strainer plate from moving back off the supporting lugs 27 due to fruit pulp tending to squeeze in between the side wall 14 and the lower edge of the strainer plate. The lugs also serve to hold the strainer plate in place against movement in the direction of travel of the presser plate.

While the device may be made in any desired way, a preferred way is to make the base, supporting member and bowl all as one casting, the presser plate and hand lever as another casting, and the strainer plate as another casting. While the parts may be made of any desired material they are preferably made of a light, strong aluminum alloy.

The operation of the device is as follows:

When the operating lever is in full open position, as indicated by dotted lines in Figure 1, the juice receptacle is placed beneath the opening 15' between side members 5 and 6 of the base. Half an orange or other fruit is then inserted in the bowl with the cut surface of the orange resting against the strainer plate 28. The operating lever 23 is then grasped at the hand grip 24 and swung to the right of Figure 1. When the presser plate 21, which is connected to the lever 23, reaches a horizontal position or somewhat below a horizontal position it comes into contact with the orange. As the lever 23 is swung further downward the fruit is squeezed against the side 14 which constitutes an abutment to directly oppose the pressing force of the presser plate and the juice flows out through the slots 33 in the strainer plate and down through the opening 15' of the bowl 15 and into the receptacle. After the hand grip 24 has been forced downward with the requisite pressure to squeeze the juice from the fruit, it is swung upward again into the open dotted position shown in Figure 1 and the squeezed orange is removed by hand.

At such times as it is desired to clean the strainer plate, it is grasped by the finger hold 32 and lifted upwardly and comes out of the bowl very easily on account of the engaging faces 35 and 36 of the lugs 34 and 37 being vertical. The strainer plate, being of very simple form, is readily cleaned in any suitable way, whereupon it is reinserted in the bowl by simply moving it downward, whereupon the lug faces 35 and 36 again interengage and position the strainer plate with its lower edge resting on the supporting lugs 27 and its upper end resting in the cut-away portion 30.

In the modified form of the invention, such as illustrated in Figures 8, 9 and 10, a presser plate 38 is provided with spaced ears 39, mounted on the pivot rod 20 between and adjacent the ears 16 and 17 of the bowl 15. Between the ears 39, the presser plate 38 is spaced back from the pivot rod 20 sufficiently to provide room for an ejector plate 40 having a semi-round portion 41 held pivoted on the pivot rod 20 by the adjacent edge of the presser plate and having upstanding lugs 42 for a purpose to be presently described. A limit lug 43 is formed on the bowl 15 and is adapted to be engaged by a wider limit lug 44 on the presser plate 38. The lugs 42 of the ejector plate have a space 45 sufficiently wide to permit the lugs 42 to swing down past the limit lug 43. In operation, the ejector plate 40 normally rests in the position shown in Figure 9, and fruit is pressed between the ejector plate which is supported against the inside of the bowl, and the presser plate. When the presser plate with its lever is swung upwardly, the lug 44 engages the lugs 42 of the ejector plate and swings the ejector plate upwardly to bring the squeezed half fruit up out of the bowl, whence it may be readily removed from the ejector plate. When the presser plate has been swung to its limit of movement with the lug 44 engaging the lug 43, the ejector plate 40 is slightly above a horizontal position and permits the operator's fingers to be engaged under the outer edge of the ejector plate, so that, if it is desired to clean the bowl without disassembling the parts, the ejector plate can be swung upward to nearly a vertical position with its lugs 42 stradling the lug 43 of the bowl. In assembling the parts, the ejector plate and presser plate are inserted in the position shown in Figure 9 and the pivot rod 20 is then slid lengthwise into position to hold the parts in assembled relation.

The invention may be embodied in other specific forms without departing from the spirit or essential characteristics of the invention, and the present embodiment is therefore to be considered in all respects as illustrative and not restrictive, the scope of the invention being indicated by the appended claims rather than by the foregoing description, and all changes which come within the range of equivalents of the claims are therefore intended to be embraced therein.

I claim:

1. A juice extractor comprising a bowl, a presser plate pivoted adjacent the bowl and adapted to be swung on its pivot to press fruit against one side of the bowl, and a strainer plate removably seated in the bowl adjacent and conforming to the path of travel of the presser plate throughout the major portion of its travel in the bowl.

2. A juice extractor comprising a bowl, a presser plate pivoted adjacent the bowl and adapted to be swung on its pivot to press fruit against one side of the bowl, a strainer plate removably seated in the bowl adjacent the path of travel of the presser plate, and means to seat the strainer plate adjacent the lower portion of said one side of the bowl.

3. A juice extractor comprising a bowl, a presser plate pivoted adjacent the bowl and adapted to be swung on its pivot to press fruit against one side of the bowl, a strainer plate removably seated in the bowl adjacent the path of travel of the presser plate, means to seat one end of the strainer plate adjacent the lower portion of said one side, and means to seat the opposite end adjacent the upper portion of the opposite side of the bowl.

4. A juice extractor comprising a bowl, a presser plate pivoted adjacent the bowl and adapted to be swung on its pivot to press fruit against one side of the bowl, a strainer plate removably seated in the bowl adjacent and conforming to the path of travel of the presser plate, the strainer plate being seated along the lower portion of said one side of the bowl, and means to hold the strainer plate seated in place against movement in the direction of travel of the presser plate.

5. A juice extractor comprising a bowl, a presser plate pivoted adjacent the bowl and adapted to be swung on its pivot to press fruit against one side of the bowl, a strainer plate removably seated in the bowl adjacent the path of travel of the presser plate, and engaging lug means on the strainer plate and bowl to hold the strainer plate in place against movement in the direction of travel of the presser plate.

6. A juice extractor comprising a bowl, a presser plate pivoted adjacent the bowl and adapted to be swung on its pivot to press fruit against one side of the bowl, a strainer plate removably seated in the bowl adjacent the path of travel of the presser plate, and lug means on the strainer plate and bowl adapted to engage each other when the strainer plate is placed in position in the bowl to hold the strainer plate in place against movement in the direction of travel of the presser plate.

7. A juice extractor comprising a bowl, a presser plate pivoted adjacent the bowl and adapted to be swung on its pivot to press fruit against one side of the bowl, a strainer plate removably seated in the bowl adjacent the path of travel of the presser plate, and lug means having upright interengaging faces on the strainer plate and bowl to hold the strainer plate in place against movement in the direction of travel of the presser plate.

8. A juice extractor comprising a bowl, a presser plate pivoted adjacent the bowl and adapted to be swung on its pivot to press fruit against one side of the bowl, a strainer plate removably seated in the bowl adjacent the path of travel of the presser plate, and lug means at opposite sides of the strainer plate and bowl to engage when the strainer plate is placed in position in the bowl to hold the strainer plate in place against movement in the direction of travel of the presser plate.

9. A juice extractor comprising a base, a support extending upwardly from the base, a bowl extending from the support and provided with a bottom opening, a presser plate pivoted adjacent the bowl, and a pivoted ejector plate located between the presser plate and the bowl the presser plate and ejector plate being adapted to be swung upward to a position a considerable distance away from a vertical line passing through the center of said bottom opening.

10. A juice extractor comprising a bowl, a pivot pin adjacent the bowl, a presser plate having spaced ears mounted on the pivot pin and having an edge intermediate the spaced ears spaced away from the pivot pin, and an ejector plate having a part round portion between the pivot pin and said edge and held pivoted to the pin by said edge.

11. A fruit juice extractor comprising a bowl, a presser plate, means pivotally mounting said presser plate for swinging movement to press fruit directly against one side of said bowl, a strainer plate conforming to the path of travel of said presser plate, and means spacing said strainer plate from the other side of said bowl to form a chamber adapted to receive fruit juice which has passed through said strainer plate.

12. A fruit juice extractor comprising a bowl, one of the sides of said bowl being adapted to form an abutment which directly receives the thrust when fruit is pressed, a strainer plate positioned within the bowl and cooperating with the opposed side of said bowl to form a juice-receiving chamber, and a presser plate pivotally mounted and movable over said strainer plate to press fruit.

13. A fruit juice extractor comprising a bowl, a presser plate pivoted about a horizontal axis and adapted to press fruit directly against one side of said bowl, a strainer plate positioned within the bowl and conforming to the path of travel of said presser plate, and means spacing said strainer plate from the other side of said bowl to form a chamber adapted to receive fruit juice which has passed through said strainer plate, said bowl having a discharge means communicating with said chamber.

14. A juice extractor comprising a bowl having two converging sides, a presser plate pivoted for swinging movement about a horizontal axis and adapted to press fruit directly against one of said sides, said bowl having substantially flat parallel end members conforming closely to the path of movement of the ends of said presser plate, a removable strainer plate positioned in said bowl and conforming closely to the path of travel of one edge of said presser plate, and means to space said strainer plate from the other of said sides to form a chamber adapted to receive fruit juice which is passed through said strainer plate, said bowl having a discharge opening communicating with said chamber.

15. A fruit juice extractor comprising a bowl, a presser plate adapted to press fruit directly against one side of said bowl, the other side of said bowl having a depression in the top surface thereof, a strainer plate having a flange seated in said depression, said strainer plate conforming closely to the path of travel of said presser plate, and means spacing said strainer plate from said other side to form a chamber adapted to receive fruit juice which has passed through said strainer plate.

16. A fruit juice extractor comprising a bowl having downwardly converging front and rear sides, a presser plate pivoted for movement about said rear side and adapted to be swung into fruit-pressing relationship with said rear side, said rear side serving as an abutment to directly oppose the action of said presser plate, a strainer plate conforming to the path of movement of said presser plate, and means positioning said strainer plate in spaced relationship to said front side, whereby a juice-receiving chamber is formed between said strainer plate and said front side, said front side having a depression at the top thereof, said strainer plate having a tongue seated in said depression and extending beyond said front side to form a handle by which said strainer plate may be removed.

17. A fruit juice extractor comprising a bowl having front and rear sides, said rear side constituting an abutment which directly receives the thrust when fruit is pressed, a presser plate, means mounting said presser plate for pivotal movement about the top of said rear side into fruit-pressing relationship therewith, whereby fruit is pressed between said presser plate and said rear side, said bowl having flat parallel end members conforming closely to the path of travel of the ends of said presser plate, said presser plate having a substantially arcuately shaped front edge, a removable strainer plate positioned within said bowl, said strainer plate being arcuate in horizontal section to conform to the arcuate front edge of said presser plate and being arcuate in vertical section to conform to the path of travel of said presser plate, said strainer plate being positioned adjacent the path of travel of said presser plate, and lug means to support said strainer plate in spaced relationship to said front side to provide a juice-receiving chamber.

18. A fruit juice extractor comprising a bowl having converging front and rear sides, said rear side directly serving as an abutment for fruit, a presser plate, means mounting said presser plate for pivotal movement about the top of said rear side into fruit-pressing relationship therewith, whereby fruit is pressed between said presser plate and said rear side, said bowl having end members conforming closely to the path of travel of the ends of said presser plate, said presser plate having a substantially arcuately shaped front edge, a removable strainer plate positioned within said bowl, said strainer plate being arcuate in horizontal section to conform to the arcuate front edge of said presser plate and being arcuate in vertical section to conform to the path of travel of said presser plate, said strainer plate being positioned adjacent the path of travel of said presser plate, and means supporting said strainer plate in spaced relationship to said front side to provide a juice-receiving chamber, said front side having a depression in the top thereof, said strainer plate having a tongue seated in said depression and extending beyond said front side to provide a handle for the removal of said strainer plate.

In testimony whereof, I have affixed my signature to this specification.

GEORGE W. BUNGAY.